E. H. LANIER & F. K. DRIESBACH.

MACHINE FOR FORMING AND BAKING HOLLOW PASTRY FORMS.

APPLICATION FILED JUNE 22, 1918.

Reissued Oct. 15, 1918. 14,534.

3 SHEETS—SHEET 1.

Inventor
Edward H. Lanier,
Frank K. Driesbach.

By Fred G. Dieterich & Co
Attorneys

E. H. LANIER & F. K. DRIESBACH.
MACHINE FOR FORMING AND BAKING HOLLOW PASTRY FORMS.
APPLICATION FILED JUNE 22, 1918.
Reissued Oct. 15, 1918.
14,534.
3 SHEETS—SHEET 2.
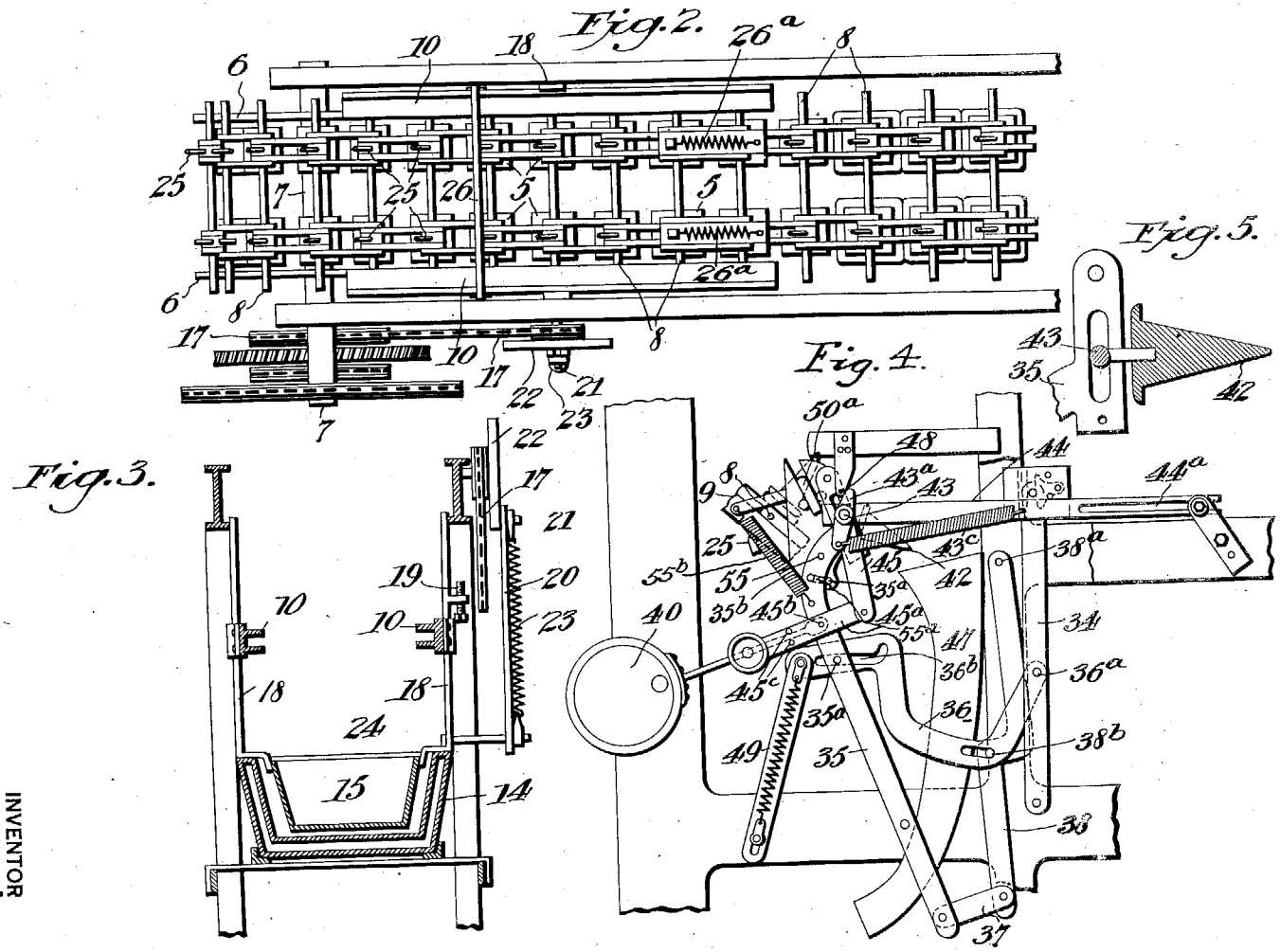
INVENTOR
Edward H. Lanier,
Frank K. Driesbach.
BY
Fred G. Dieterich & Co.
ATTORNEYS

E. H. LANIER & F. K. DRIESBACH.

MACHINE FOR FORMING AND BAKING HOLLOW PASTRY FORMS.

APPLICATION FILED JUNE 22, 1918.

Reissued Oct. 15, 1918.

14,534.

3 SHEETS—SHEET 3.

INVENTOR

Edward H. Lanier,
Frank K. Driesbach.

BY

Fred G. Dieterich & Co.

ATTORNEYS

UNITED STATES PATENT OFFICE.

EDWARD H. LANIER AND FRANK K. DRIESBACH, OF CINCINNATI, OHIO.

MACHINE FOR FORMING AND BAKING HOLLOW PASTRY FORMS.

14,534. Specification of Reissued Letters Patent. Reissued Oct. 15, 1918.

Original No. 1,215,556, dated February 13, 1917, Serial No. 22,902, filed April 21, 1915. Application for reissue filed June 22, 1918. Serial No. 241,406.

*To all whom it may concern:*

Be it known that we, EDWARD H. LANIER and FRANK K. DRIESBACH, citizens of the United States, residing at Cincinnati, Hamilton county, State of Ohio, have invented certain new and useful Improvements in Machines for Forming and Baking Hollow Pastry Forms, of which the following is a specification.

The subject matter of the present invention is a machine for forming and baking hollow pastry articles, being especially adapted for the manufacture of "ice cream cones."

In the accompanying drawings,

Fig. 2 is a plan view of a portion of the machine;

Fig. 3 is a transverse vertical section on an enlarged scale through the devices for applying batter to the forming cores;

Fig. 4 is an enlarged detail view of the means for extracting the baked articles from the molds and for greasing the forming cores;

Fig. 5 is a detail section through an extracting core;

Figure 1:
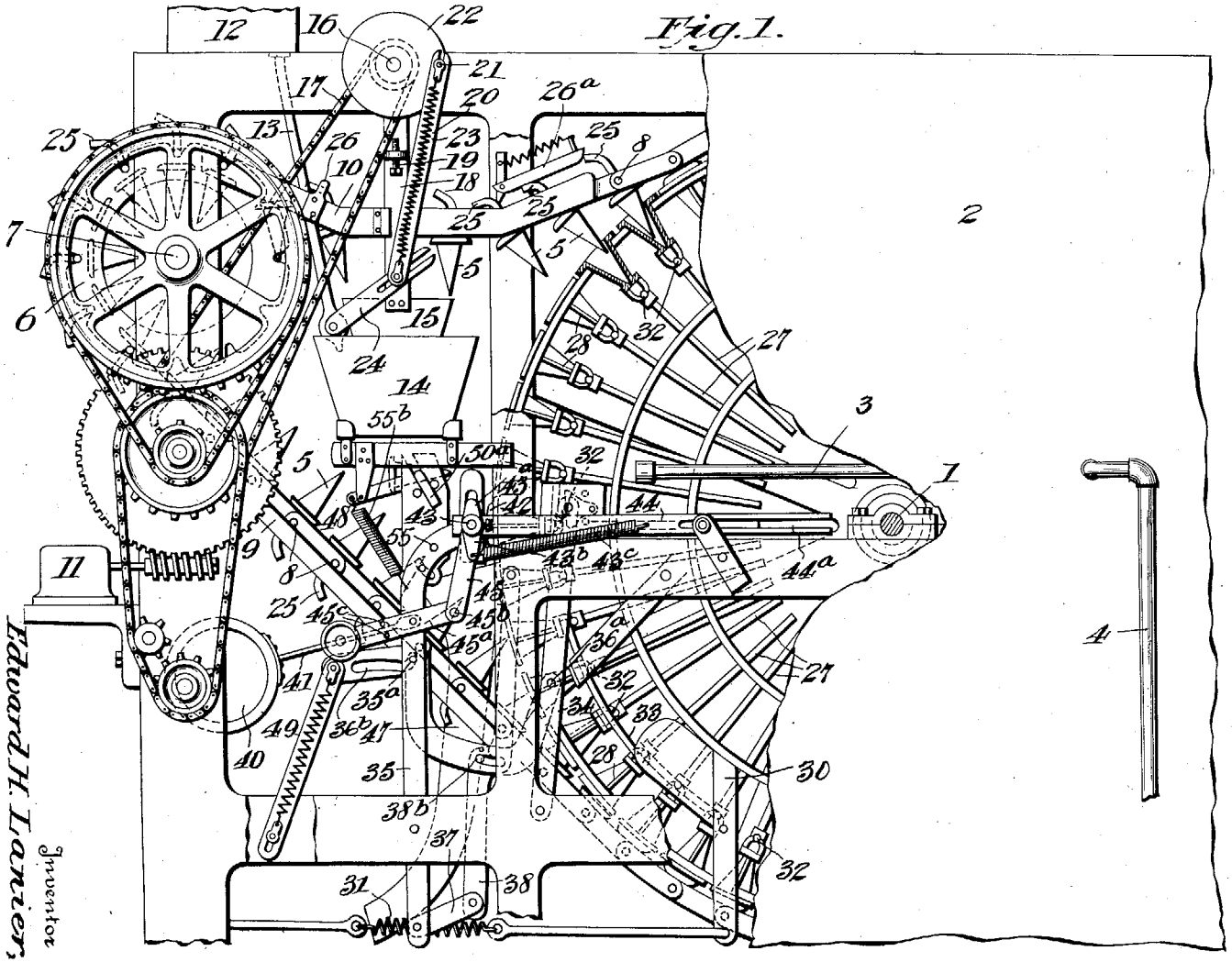
Figure 1 is a side elevation, partly in section, of a machine constructed in accordance with the invention.

Referring to the drawings, the machine in its preferred form comprises a series of molds and an endless carrier which supports a series of forming cores and extends partially about the mold carrier, the several molds in which are each adapted to receive one of the cores during a portion of the travel thereof. In the embodiment of the invention illustrated the molds are supported in a drum-like body mounted on a horizontal shaft or rod 1, the molds being arranged in two series about the periphery of said body and both series being inclosed, except at one end, by a suitable casing or housing 2. This housing or casing is interiorly heated, as by suitable burners 3, the gas or other fuel for which is supplied through a pipe 4.

The forming cores 5 are supported by an endless carrier that extends about the mold drum and suitable supporting wheels 6 on a shaft 7 journaled in the frame work of the machine. The cores 5 are arranged in pairs corresponding to the molds, each pair being connected and having laterally projecting pins 8 that engage the teeth of the wheels 6 and the guides 9, 10 that are supported by the frame work between said wheels and the mold drum. The cores are so connected with the endless carrier as to be capable of rocking slightly relative to said carrier for a purpose to be hereinafter more particularly referred to.

The shaft 7 is driven by suitable chain and sprocket gearing from a motor 11 and as the endless core carrier travels the series of molds will be given a corresponding movement, the several cores entering the molds, traveling therein for a sufficient distance through the housing or casing 2 to enable the mold contents to be properly baked, and being removed from the molds at the forward end of said housing.

The batter from which the articles are formed is contained in an elevated tank 12 from which it is supplied through a depending pipe 13 to an open top receptacle 14 supported on the main frame beneath the upper run or section of the endless forming core carrier. This receptacle 14 is preferably provided with double walls, or a water jacket, so that the batter therein will be maintained at the desired temperature. Said receptacle being positioned close to the open end of the mold housing 2, the batter therein is liable to be overheated unless some such cooling means as this is provided. The necessary batter for forming the cone is transferred from the receptacle 14 to the cores 5 immediately thereover by a transfer cup 15, which is supported from a shaft 16 suitably journaled on the frame of the machine and driven, as by chains 17 and suitable gearing, from the motor 11. As shown, this transfer cup is provided at its sides with upwardly extending arms 18 that are suitably guided in the frame of the machine and one of which has mounted thereon an adjustable stop 19. Said transfer cup is connected with the lower end of a link 20, the upper end of which is bifurcated to extend on opposite sides of a stud or pin 21 projecting laterally from a disk 22 on the end of shaft 16. A spring 23 connects the pin 21 with a pin adjacent the lower end of the link 20. The parts are so arranged that when the cup 15 is in its lowest position it will be below the level of the batter in the receptacle 14 and as said cup is reciprocated a uniform coating of the cores 5 thereover is insured. The extent to which the cores over the transfer cup are coated with batter is determined by adjustment of the screw stop 19 which, by contact with an abutment carried by the main frame, positively limits upward movement of the transfer cup 15. In case the extent of such movement is less than that which would be imparted to the cup if the connection between it and the disk 22 was rigid, the pin 21 will move longitudinally of the bifurcation in the link 20, stretching the spring 23 slightly as said pin passes its highest position. By this means it is possible to make the articles produced by the machine of the desired length and avoid waste of batter. To maintain the desired quantity of batter in the receptacle 14, a suitable valve is provided adjacent the lower end of the batter supply duct or pipe 13, said valve being connected with an arm 24 that engages the supporting link 20 of the transfer cup. Therefore, as this cup is reciprocated the valve in the batter supply duct 13 will be automatically opened and closed whereby the necessary amount of batter will be constantly maintained in said receptacle.

To avoid any possiblity of interference between the cores 5 and the batter transfer cup 15 means are provided whereby the cores are rocked slightly from their normal position as they approach a position above said cup. As shown, each core is provided with a bent arm 25 that is adapted to be engaged by a guard 26 extending across the guides for the endless core carrier so that the cores will be carried into an inclined position in passing said guard as shown and there will be no danger of a core striking the outer side of the cup 15 as the latter rises from the receptacle 14. When the cores come directly above the transfer cup, or into position to be coated, they are, as shown, in a substantially vertical position. The arms 25 further coöperate with a spring actuated guide 26ª to tilt or rock the coated cores slightly so that they will come into proper alining position with the molds as they are carried along by the endless carrier.

Figure 6:
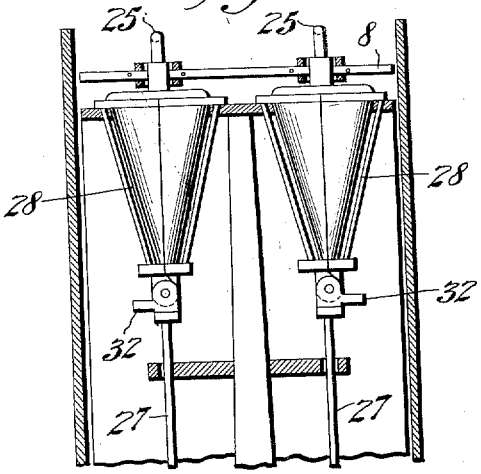
Fig. 6 is a sectional view of a portion of the mold carrier, on an enlarged scale.
Figure 7:
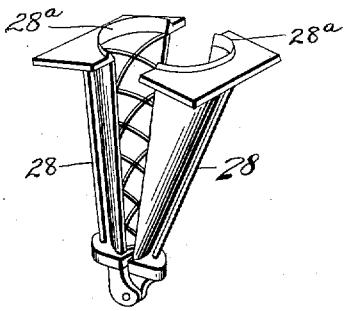
Fig. 7 is a detail view of one of the molds in open position.

The molds are preferably made in the form particularly illustrated in Figs. 6 and 7, each comprising two sections pivotally connected adjacent their inner ends. Means are provided whereby these sections of the mold are opened or closed bv movement in a direction radially of the supporting drum. As shown, each mold is provided with a radially extending rod 27 that passes through suitable guides in the supporting drum, and with inclined guides 28 that extend through apertures in the peripheral wall of the drum, whereby, as the rod 27 and attached mold are moved outward, the sections of the mold will be opened and during inward movement of said parts the mold will be closed. A knife edge 28ª is provided about the mouth of the mold.

Means are provided whereby the molds will be automatically opened and closed as the drum-like support therefor rotates and also for withdrawing the baked articles from the cores after the latter and the forming cores have been separated. As the molds are preferably arranged in two parallel series about the periphery of the drum the means for loosening the baked articles, opening and closing the molds and removing the product will be duplicated at the two sides of the machine. 30 indicates a lever which is suitably fulcrumed in the frame work of the machine and has one arm connected with a spring 31 and its other arm extending substantially parallel to the periphery of the mold drum carrier. Each of the molds is provided with a laterally projecting pin or stud 32 adapted to coöperate with said lever 30 to loosen the contained pastry from the forming core and to be engaged by positively acting means by which the mold is adjusted radially of the drum to move the sections thereof into open or closed relation. The latter means include levers 34 fulcrumed on the frame adjacent their lower ends and having at their upper ends guide ways through which the pins 32 pass as the molds rotate. As shown, the lever 30 is so positioned that the pin 32 of each mold will coöperate with a groove or guide on the inner face of the lateral projection thereon just prior to the beginning of the movement of separation by which the forming core 5 is withdrawn from its coacting mold. As the pin 32 engages said guide on the lever 30 the mold will be held from moving outwardly due to the pull of the core should it adhere too tightly to the cone. If the core sticks to the cone and tends to pull the mold radially outwardly, as the core carrier leaves the periphery of the mold carrying wheel, the mold will be held against outward or radial movement by the action of the spring 31 whose tension is sufficient to prevent the molds moving outwardly at any time while the pins 32 are in engagement with the member 30. The springs 31 are designed to have sufficient tension to hold the molds tight against the wheel, through the instrumentality of the part 30, until the cores are pulled free from the cones or pastry forms. There is no radial movement of the molds until the cores are free from the cones. While the member 30 could be made as a rigid member if properly located yet the construction would be restricted for the reason that the spring allows a very slight give or resilience in the arm 30 in case the molds or other parts are not machined absolutely accurate so that any inaccuracy in the machine work will not cause the molds to wedge or jam as might be the case were the part 30 a rigid member. The contact between the pin 32 and the lateral arm of the lever 30 maintains the mold tightly closed or locked while the core 5 is being withdrawn therefrom and retains the baked article in position therein. A stationary curved guide 33 is provided beyond the end of the lever 30 for maintaining the molds in closed position until the pins 32 thereof are engaged by the means provided for moving them radially outward and opening the sections thereof.

Said levers 34 are connected with levers 35, by which the extracting devices are carried. As these connections and the levers 34, 35 are duplicated on opposite sides of the machine only one set thereof will be herein particularly described.

The lever 35 is fulcrumed on the frame of the machine at an intermediate point in its length and above its fulcrum is connected with the lever 34 by a lever-like link 36 fulcrumed at one end at $36^a$, on the lever 34 and provided adjacent its other end with a slot that receives a pin $35^a$ on the lever 35. A link 37 connects the lower end of lever 35 with a lever 38 that is fulcrumed at $38^a$ on the frame of the machine and provided with a pin $38^b$ which extends into a slot in the lever 36. A suitable eccentric 40 driven by the motor 11 is connected with lever 35, through a rod 41, and when the extracting cores are positioned within the alined molds, and prior to the removal of the pastry therefrom the several parts above referred to occupy the relative positions shown in Fig. 1. At this time the pin $35^a$ is engaged in a notch or lateral extension at the inner end of the slot $36^b$, in the lever 36, so that the two levers 34, 35 are positively connected and will be simultaneously rocked outward (or to the left in Fig. 1) by the action of the eccentric 40.

The extracting cores 42 are mounted on a bar or rod 43 that extends through slots formed in heads arranged at the upper ends of the levers 35, the rod being so supported that it may have a limited movement in said slots and that the cores 42 will be caused to accurately aline with and readily enter the opposite molds when the machine is working. As shown a guide bar 44 extends rearwardly from each end of the rod 43 and is provided with a slot $44^a$ receiving a pin or stud mounted on the frame of the machine. From the rod 43 depends a link 45 that at its lower end is pivotally connected with a lever $45^a$, fulcrumed at $45^b$, and having laterally projecting pins or studs $45^c$ between which the eccentric connecting rod 41 extends.

These connections act to normally maintain the extracting cores in such position that their points are directed toward the molds but means are provided for directing said cores downward so that the baked pastry articles may fall therefrom into a delivery chute 47. The rod 43 is revolubly mounted in the guide bars 44 and is provided at its ends with rocker arms $43^a$, $43^b$, extending, respectively, above and below the axis thereof. A spring $43^c$ acts to hold the arms $43^a$, $43^b$ in substantially vertical position. As the lever 35 swings away from the molds the arm $43^a$ strikes a stationary pin 48 which causes a rocking of the rod 43, stretching the spring $43^c$, as shown in Fig. 4, so that the cores 42 are directed downward and the baked articles can slip therefrom into the upper, open, end of the chute 47.

In Fig. 1 the parts are shown in the positions occupied when the extracting cores are within the alined molds and the pins 32 of the latter are near the lower end of the guides therefor on the levers 34. As the eccentric 40 moves the lever 35 forward, or in a direction away from the molds, the lever 34 is carried in the same direction, being connected thereto by reason of the pin $35^a$ occupying the notch at the rear end of the slot $36^b$, thus the extracting core and the mold in which it is positioned begin to move outwardly together. This outward movement of the mold engaged by the lever 34 causes a separation of the sections thereof that releases them from the baked article therein which is then supported by the extracting core 42. The forward end of lever 36 is connected with the main frame by a yielding link 49 which, when said lever has been moved forward sufficiently far to bring the pin $38^b$ on lever 38 (which through link 37 is moved rearwardly by lever 35) adjacent the rear end of the slot in which it works, lifts the lever 36 sufficiently to release the pin $35^a$ therefrom. During the further forward movement of the upper end of lever 35 therefore the lever 34 (through the parts, 37, 38, 36) will be moved rearwardly to close the mold. As the lever 35 approaches the limit of its forward movement the extracting cores will be rocked (by the arm $43^a$ striking the pin 48) to permit the articles supported thereon to fall into the chute 47. On the return movement of the lever 35, the cores 42 are first restored to normal, substantially horizontal, position by the spring $43^c$ and introduced into the molds that have been brought into alinement therewith by rotation of the drum. During this movement the lever 34 remains stationary the pins $38^b$ and $35^a$ move longitudinally of the slots in the link 36 into which they extend and at the termination of such rearward movement the link 36 is given a slight downward movement about its fulcrum $36^a$, owing to the connection of the link 49 therewith so that the pin $35^a$ is caused to enter the notch at the rear end of the slot in which it works.

Figure 8:
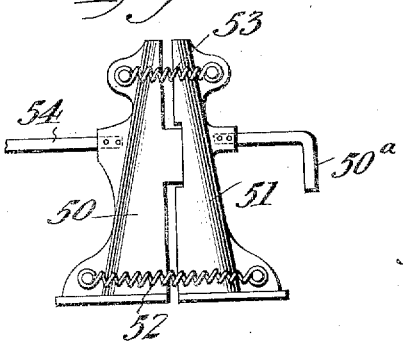
Fig. 8 is a detail view of a core greasing device.

The core extracting levers also support means for greasing the cores 5. On each of the levers 35 is pivotally mounted at 55 a rocking head and in a suitable slot formed in each of said heads is arranged a projection $50^a$ from one of a pair of sectional bodies lined with felt or other suitable absorbent material and adapted to conform closely to the cores 5. As shown in Fig. 8 each of said bodies includes two sections, 50, 51, connected by springs 52, 53, so that they will fit closely about one of the cores, said bodies being connected together as by a rod 54. As the levers 35 swing forward the core greasing members are carried from the position indicated in Fig. 1 to that shown in Fig. 4 so as to surround the alined cores 5. Each of the said heads on the levers 35 is adapted to have a limited swinging movement about its pivot 55 so that the greasing device is adapted to travel with the engaged core 5, while the lever 35 is turning about its pivot or there is relative movement between said lever and the endless core carrier. Such turning movement of either of said heads on its lever 35 is limited by engagement of a pin or stud on the lever with the ends of a slot $55^a$; and a spring $55^b$ is provided to return said parts to normal relation. On the return movement of the lever 35 the greasing devices are disengaged from the cores and returned to substantially the position shown in Fig. 1.

Figure 9:
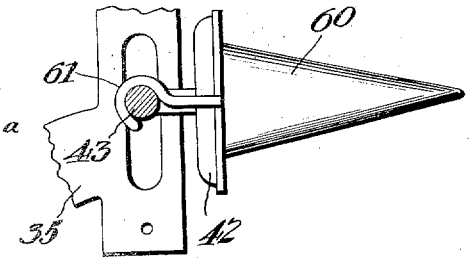
Fig. 9 is a view of a device for greasing the molds.

It is occasionally desirable, particularly when first starting the machine, to apply a certain amount of grease to the molds. To accomplish this the present machine includes a cone shaped body 60, see Fig. 9, of suitable absorbent material and arranged to slip over each extracting core 42, being held in place by hooks 61 engaging the bar 43. The mold greasing devices can be readily detached from the cores 42 so as not to interfere with the action of said cores in extracting the baked articles from the molds.

It is believed that the operation of the machine will be readily understood from the foregoing description in connection with the drawings, which illustrate a preferred embodiment of the invention but we do not desire it understood that the invention is to be limited to the specific construction shown and described but modifications and other specific embodiments of the invention can readily be made without departing from the spirit of the invention or the scope of the appended claims.

Having thus described the invention, what is claimed and desired to be secured by Letters Patent is:

1. In a machine for the purpose described, the combination of a series of cores, an endless carrier supporting the cores, a series of molds each adapted to receive one of the cores during a portion of the travel thereof, means for successively effecting relative movement between each core and its mold, to loosen the pastry from the core, an extracting device adapted to move into and from the molds from which the cores have been withdrawn successively, and means for disengaging the pastry from the mold in which said device is positioned.

2. In a machine for the purpose described, the combination of a series of cores, an endless carrier supporting the cores, a series of molds each adapted to receive one of the cores during a portion of the travel thereof, means for successively effecting relative movement between each core and its mold, to loosen the pastry from the core, an extracting core, means for moving said extracting core into and from the molds from which the forming cores have been removed successively, means for disengaging the pastry from the mold in which the extracting core is positioned to permit it to be removed with said core, and means for rocking the extracting core to discharge the pastry form therefrom.

3. In a machine for the purpose described, the combination of a series of forming cores, an endless carrier supporting the cores, a series of sectional molds each adapted to receive one of said cores during a portion of the travel thereof, an extracting core movable into and from the molds from which the forming cores have been removed successively, and means for effecting relative movement between the sections of the mold in which the extracting core is positioned to release the article therein and permit it to be removed on the extracting core.

4. In a machine for the purpose described, the combination of a series of forming cores, an endless carrier supporting the cores, a series of sectional molds each adapted to receive one of said cores during a portion of the travel thereof, and to have the sections thereof adjusted to open or closed position by movement in the direction of its length, an extracting core movable into and from the molds from which the forming cores have been removed successively and means for moving the mold in which the extracting core is positioned longitudinally as the core is moving outward to adjust the sections thereof to open position and release the article therein so that it will be removed on the extracting core.

5. In a machine for the purpose described, the combination of a drum-like body provided with a series of peripheral sectional molds, a series of forming cores, an endless carrier for said cores, each mold being adapted to receive one of the forming cores during a portion of the travel thereof, means for heating the molds, means for successively effecting relative movement between each core and its mold while the sections of the latter are in closed relation to loosen the baked article from the core, an extracting core movable into and from the molds from which the forming cores have been removed successively, and means for effecting relative movement between the sections of the mold in which the extracting core is positioned to release the article therein and permit it to be removed on the extracting core.

6. In a machine for the purpose described, the combination of a series of forming cores, an endless carrier therefor, a series of sectional molds each adapted to receive one of said cores during a portion of its travel, a heating means, means for positively holding the sections of each mold in closed relation while the forming core is being removed therefrom, an extracting core adapted to enter the molds from which the forming cores have been removed successively, and means for causing the mold in which the extracting core is positioned to move with the said core for a limited distance and simultaneously open to release the baked article therein and permit it to be removed on the extracting core.

7. In a machine for the purpose described, the combination of a series of forming cores, an endless carrier therefor, a series of sectional molds each adapted to receive one of said cores during a portion of its travel, a heating means, an extracting core adapted to enter the molds from which the forming cores have been removed successively, and means for engaging the mold in which said forming core is positioned adapted to adjust the sections of said mold to open position as the extracting core is removed to release the baked article therein and permit it to be removed on the extracting core.

8. In a machine for the purpose described, the combination of a series of forming cores, an endless carrier therefor, a series of sectional molds each adapted to receive one of said cores during a portion of its travel, a heating means, an extracting core adapted to enter the molds from which the forming cores have been removed successively, a lever adapted to engage the mold in which the extracting core is positioned, and means connecting said lever with the support for the extracting core whereby the sections of the mold engaged by said lever will be moved to open position to loosen the baked article therein and permit it to be removed on the extracting core.

9. In a machine for the purpose described, the combination of a series of forming cores, an endless carrier therefor, a series of sectional molds each adapted to receive one of said cores during a portion of its travel, a heating means, an extracting core adapted to enter the molds from which the forming cores have been withdrawn successively, a lever supporting said extracting core, a second lever adapted to engage the mold in which the extracting core is positioned, and means connecting said levers whereby as the extracting core is removed the sections of the mold within which it is positioned will be adjusted to open position to release the baked article therein and permit it to be removed on the extracting core.

10. In a machine for the purpose described, the combination of a series of forming cores, an endless carrier therefor, a series of sectional molds each adapted to receive one of said cores during a portion of its travel, a heating means, an extracting core adapted to enter the molds from which the forming cores have been removed successively, means adapted to move the sections of the mold in which said extracting core is arranged to open position and permit the baked article to be removed on said core, and means moving with the extracting core for greasing the forming cores successively.

11. In a machine for the purpose described, the combination of a series of forming cores, an endless carrier therefor, a series of molds each adapted to receive one of said cores during a portion of its travel, a batter carrier adapted to be reciprocated to apply batter to the forming cores successively, means for regulating the extent to which said cores will be coated with batter, means for heating the molds, and means for removing the baked articles from the molds.

12. In a machine for the purpose described, the combination of a series of forming cores, an endless carrier therefor, a series of molds each adapted to receive one of said cores during a portion of its travel, a batter receptacle over which the cores travel, a reciprocating batter cup adapted to transfer batter from said receptacle to the cores successively, means for supplying batter to the receptacle controlled by movement of said transfer cup, means for heating the molds, and means for removing the baked articles from the molds.

13. In a machine for the purpose described, the combination of a series of forming cores, an endless carrier therefor, a series of molds each adapted to receive one of said cores during a portion of its travel, a batter receptacle over which the cores travel, a reciprocating batter cup adapted to transfer batter from said receptacle to the cores successively, means for varying the length of reciprocation of said transfer cup, means for supplying batter to the receptacle controlled by movement of said transfer cup, means for heating the molds, and means for removing the baked articles from the molds.

14. In a machine for the purpose described, the combination of a series of forming cores, an endless carrier therefor, a series of molds each adapted to receive one of said cores during a portion of its travel, means for heating the molds, a lever arranged to swing toward and from th molds from which the forming cores have been removed, an extracting core carried by said lever to move into and from said molds successively, and means for rocking the extracting core on said lever to discharge the baked article therefrom after it is removed from a mold.

15. In a machine for the purpose described, the combination of a series of forming cores, an endless carrier therefor, a series of molds each adapted to receive one of said cores during a portion of its travel, means for heating the molds, the cores being removable bodily from the molds as the carrier travels, means for engaging and removing the baked articles from the molds after the forming cores have been removed, and means for greasing the forming cores successively, said means comprising a hollow body mounted to move longitudinally of the core.

16. In a machine for the purpose described, the combination of a drum-like body provided with a series of peripheral molds, an endless carrier extending about said body, means for guiding a section of the carrier away from the molds, cores on said carriers, each adapted to enter and be removed from a mold as the carrier travels, and means arranged between the carrier and the mold supporting drum for greasing the cores while the latter are out of the molds.

17. In a machine for the purpose described, the combination of a series of forming cores, an endless carrier therefor, a series of molds each adapted to receive one of said cores during a portion of its travel, means for heating the molds, means for removing the baked articles from the molds after the forming cores have been removed, and means for greasing the forming cores successively, said means comprising a hollow body adapted to surround and move longitudinally of a core while traveling therewith.

18. In a machine for the purpose described, the combination of a series of forming cores, an endless carrier therefor, a series of molds each adapted to receive one of said cores during a portion of its travel, and means arranged between the molds from which the forming cores have been removed and said cores adapted to successively grease the molds and cores.

19. In a machine for the purpose described, the combination of a series of forming cores, an endless carrier therefor, a series of molds each adapted to receive one of said cores during a portion of its travel, an extracting core adapted to enter the molds from which the forming cores have been removed successively, and a mold greasing device adapted to be secured about said extracting core.

20. In a machine for the purpose described, the combination of a series of forming cores, an endless carrier therefor, a series of molds each adapted to receive one of said cores during a portion of its travel, means for heating the molds, a lever arranged to swing toward and from the molds from which the forming cores have been removed, an extracting core carried by said lever to move into and from said molds successively, a lever adapted to engage the mold in which the extracting core is positioned and actuate said mold to disengage it from the article therein, and means connecting said levers and adapted to actuate the mold lever to open and close the mold, during outward movement of the lever supporting the extracting core.

21. In a machine of the class described wherein is provided a plurality of sets of separable molds and forming cores therefor, means for heating the same and means for causing the opening and closing of the molds and the introducing and removing of the cores to and from the mold cavities; a set of dummy or extractor cores, automatic means for introducing said dummy or extractor cores into and removing the same from the mold cavities of the baked articles after removal of the forming cores.

22. In a machine of the class described wherein is provided a plurality of sets of separable molds and forming cores therefor, means for heating the same and means for causing the opening and closing of the molds and the introducing and removing of the cores to and from the mold cavities; a set of dummy or extractor cores, automatic means for introducing and removing said dummy or extractor cores to and from the mold cavities after removal of the forming cores, and means for holding the dummy or extractor cores in position to project into the baked articles until the molds open sufficiently to detach the articles from the mold walls.

23. In a machine of the class described, the combination of a series of sectional molds, forming cores therefor and an extracting core, means for removing the forming cores, automatic means for inserting the extracting core, and means for causing the opening of the sectional molds after the extracting core has been inserted.

24. In a machine of the class described, the combination with a sectional mold, a forming core therefor, and an extracting core, mechanical devices for removing the forming core, automatic devices for inserting the extracting core in lieu of the forming core, and means for opening the sectional mold after the extracting core has been inserted.

25. In a machine of the class described, the combination with a sectional mold, a forming core therefor, and an extracting core, mechanical devices for removing the forming core, automatic devices for inserting the extracting core in lieu of the forming core, means for opening the sectional mold after the extracting core has been inserted, and means for removing the extracting core, closing the sectional mold and restoring the forming core.

26. In a machine of the class described, a series of sectional molds, forming cores therefor, an extracting core, means for causing travel of said molds and forming cores, means for first removing the forming core from a mold and then introducing the extracting core in lieu of the forming core, and means for opening the sectional molds while the extracting core is positioned in the same, and means for subsequently removing the extracting core from the molds to permit the reintroduction of one of the forming cores.

27. In a machine of the character described, a series of forming cores, a series of molds, each adapted to receive one of said cores, a traveling support for the series of cores and molds, means for successively effecting relative movement between each core and its mold to loosen the pastry from the core and removing and introducing the core from and to the mold, an extracting device adapted to move into and from the molds from which the cores have been withdrawn successively, mechanism located at a relatively fixed location or station for introducing the extracting device to and removing the same from the molds from which the cores have been removed, and means for opening the molds while the extracting device is within the same to effect a disengagement of the pastry from the mold in which said device is positioned.

28. In a machine of the character described, the combination with a plurality of forming cores, a plurality of sectional molds, each adapted to receive one of the cores, means for effecting travel of the molds and cores, means for successively effecting relative movement between each core and its mold to loosen the pastry from the core, an extracting core, means for moving said extracting core into and from the molds from which the forming cores have been withdrawn successively, means for opening the molds to disengage the pastry from the mold in which the extracting core is positioned to permit it to be extracted by said core, and means for moving the extracting core to discharge the pastry therefrom.

29. In a machine of the character described, the combination of a plurality of forming cores and a plurality of sectional molds each adapted to receive one of the cores, means for supporting the molds and cores to travel in closed paths, means for successively effecting relative movement between each core and its mold to loosen the pastry from the core, an extracting core, means for moving said extracting core into and from the molds from which the forming cores have been withdrawn successively and means for opening the molds to disengage the pastry from the mold in which the extracting core is positioned.

30. In a machine of the character described, the combination of a plurality of forming cores, a plurality of sectional molds, each adapted to receive one of said cores, means for effecting travel of the molds and cores, an extracting core movable into and from the molds from which the forming cores have been withdrawn successively, and means for effecting relative movement between the sections of the mold in which the extracting core is positioned to release the article from the molds.

31. In a machine of the character described, the combination of a plurality of forming cores, a plurality of sectional molds, each adapted to receive one of said cores, means for effecting travel of the molds and cores, a relatively stationarily located extracting core coöperative with all of the molds and movable into and from the molds from which the forming cores have been withdrawn successively and means for effecting relative movement between the sections of the mold in which the extracting core is positioned to release the article from the molds.

32. In a machine of the character described, the combination of a series of forming cores, a series of sectional molds, each adapted to receive one of said cores at times, a heating means, means for holding the sections of each mold in closed relation while the forming core is being withdrawn therefrom, an extracting core adapted to enter the molds from which the forming cores have been withdrawn successively, and means for causing the mold in which the extracting core is positioned to separate whereby the extracting core will detach the article from the mold walls and mechanically actuated devices for introducing and removing the extracting core to and from the mold cavities, said means including an extracting core carrier and a swinging mechanism for moving said extracting core into and out of position.

33. In a machine of the character described, the combination of a plurality of forming cores, a plurality of sectional molds each adapted to receive one of the cores at times, means for supporting the molds and forming cores to travel in closed paths, means for successively effecting relative movement between each core and its mold to loosen the pastry from the core, an extracting core common to all of the molds and relatively fixed as to location with respect to the travel of the molds and cores, means for moving said extracting core into and from the molds from which the forming cores have been withdrawn successively, means for opening the mold in which the extracting core is positioned to permit the pastry to be disengaged from the mold walls, and means for heating the molds and cores.

34. In a machine of the class described, the combination of a plurality of sets of molds, and a plurality of sets of cores, there being cores for each set of molds, a conveyer for causing the travel of the sets of cores as a whole, a batter carrier coöperative with all of the cores and located beneath the plane of the cores at the loading place and in line with the direction of travel of the core conveyer, means for effecting relative travel between the cores and the batter carrier whereby to bring the cores and batter carrier into relative position with the cores over the batter carrier, and means for raising and lowering the batter carrier to apply batter to the cores as the cores of each set are located above the batter carrier, means for heating the molds and means for releasing the baked article from the molds.

35. In a machine of the class described, a plurality of sets of forming cores, a plurality of sets of molds each adapted to receive one of said sets of cores, a batter reservoir located beneath the cores at the loading place and in line with the direction of relative movement between the cores and batter carrier, means for effecting relative travel between said reservoir and cores whereby the sets of cores will be positioned successively above the reservoir, and a reciprocating batter cup adapted to dip into said reservoir to obtain a supply of batter and elevate said supply to the cores whereby the cores will be dipped therein, and means for effecting the reciprocation of said batter cup.

36. In a machine of the class described, a plurality of sets of forming cores, a plurality of sets of molds each adapted to receive one of said sets of cores, a batter reservoir located beneath the cores, at the loading place and in line with the direction of relative movement between the cores and batter carrier, means for effecting relative travel between said reservoir and cores whereby the sets of cores will be positioned successively above the reservoir, and a reciprocating batter cup adapted to dip into said reservoir to obtain a supply of batter and elevate said supply to the cores whereby the cores will be dipped therein, means for effecting the reciprocation of said batter cup, and means for regulating the extent to which said cores will be coated with batter.

37. In a machine of the class described, the combination with a series of mold and core units, a conveyer for carrying said units from place to place, an extracting core located at a definite place or station, past which the molds of the several units are conveyed, means for removing the forming cores, means for supporting the extracting core at its station and for introducing the extracting core into the adjacent mold of a unit and thereafter removing the extracting core from said mold, and means for opening the mold in which the extracting core is located.

EDWARD H. LANIER.
FRANK K. DRIESBACH.